Nov. 19, 1940.    H. D. GEYER    2,222,200
WEATHER STRIP AND SCUFF STRIP FOR AUTOMOBILE BODY DOORS
Filed Jan. 10, 1938
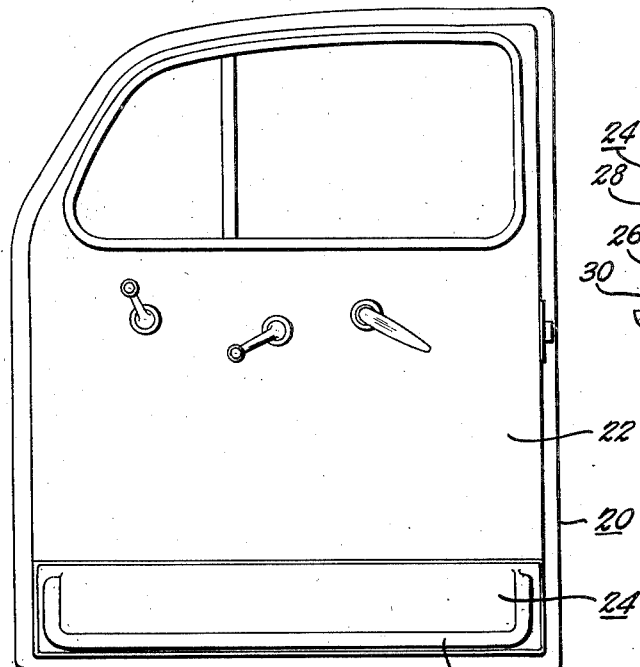
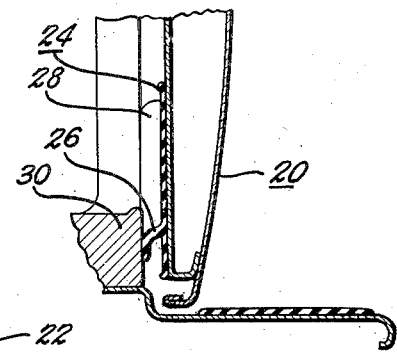
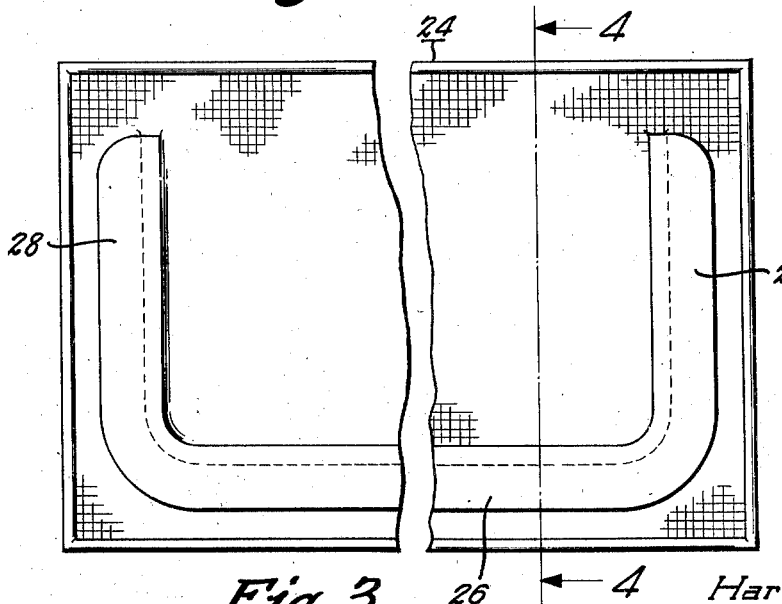
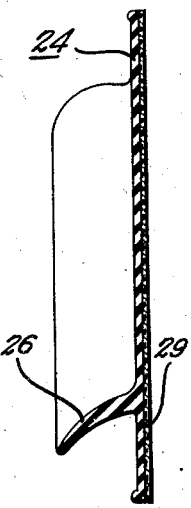
INVENTOR
Harvey D. Geyer
BY
Spencer Hardman & Fisher
his ATTORNEYS Patented Nov. 19, 1940

2,222,200

UNITED STATES PATENT OFFICE 2,222,200

WEATHER STRIP AND SCUFF STRIP FOR AUTOMOBILE BODY DOORS

Harvey D. Geyer, Dayton, Ohio, assignor to General Motors Corporation, Detroit, Mich., a corporation of Delaware Application January 10, 1938, Serial No. 184,128

5 Claims. (Cl. 296—44)

The present invention relates to automobile bodies and more particularly to scuff strips and sealing strips used with automobile doors.

One of the objects of the present invention is to provide a door covering to be used in combination with an automobile door, which covering consists of a sheet of resilient material, such as rubber, that includes an outwardly extending lip thereon, said lip being adapted to engage and seal with the sill of the door frame when the door is in closed position.

A further object is to provide a door covering of resilient material that includes an outwardly extending lip integrally formed therewith, said lip being disposed adjacent the lower edge of the said covering.

It is a still further object in carrying out the above objects to provide the sheet of resilient material that only covers the lower portion of the door and thereby functions as a scuff strip.

Another object of the invention is to provide an automobile door with a lip or flange of resilient non-metallic material disposed adjacent the bottom of the door, said lip yieldably contacting the door sill when the door is closed, for sealing the door to the sill.

Further objects and advantages of the present invention will be apparent from the following description, reference being had to the accompanying drawing wherein a preferred embodiment of the present invention is clearly shown.

In the drawing:

Fig. 1 is a side view of an automobile door illustrating the position of the scuff and weather strip.

Fig. 2 is a fragmentary view, in section, of a door in closed position, showing the outwardly extending lip of the door covering in sealing engagement with the sill.

Fig. 3 is a view, on an enlarged scale, of the resilient door covering showing the integral lip thereon, and Fig. 4 is a section taken on line 4—4 of Fig. 3.

Doors, for example doors used on automobiles, which are upholstered on the inside frequently have the upholstery soiled and mutilated during use thereof. This is caused by persons in the automobile kicking the door adjacent the lower edge thereof while leaving the car, and also from mud and water on the streets being splashed against the door at the lower edge thereof. Then too, automobile doors are difficult to seal adjacent the lower edge thereof for preventing air from entering the car.

The present invention is directed to an improved door covering or scuff strip which may be fastened to the door adjacent the lower edge thereof, and which is not readily mutilated and which may be easily washed when desired. Furthermore the present door covering includes a resilient lip or flange adjacent the lower edge thereof, which lip engages and seals against the door sill, and thereby functions as a weather strip for sealing the lower portion of the door to the sill.

Referring to the drawing, an automobile door 20 is shown having the usual upholstery 22 fastened to the inner side thereof. A rectangular covering strip 24 is provided for the lower section of the door and the present invention is directed to this covering and its associated parts.

The covering 24 is preferably fabricated from resilient rubber and may have a decorative design molded on the outer surface thereof during the fabrication of the strip. An outwardly and downwardly extending flange or lip 26 preferably formed integrally with the covering 24 is disposed adjacent the lower edge of the covering 24, and may, in some cases if desired, extend upwardly as at 28 adjacent the two side portions of the covering 24. When the door 20 is in closed position, the bottom thereof is spaced from the door sill 30. In order to close this gap the lip 26 is dimensioned so as to yieldably engage the sill 30 and in this manner seal against the door sill 30 as noted in Fig. 2. The upwardly extending portions 28 of the lip 26 also seal against the sill 30 and the door frame, when such portions 28 are provided. Thus when the door is closed, the lip 26 substantially seals the same at the lower edge thereof. If desired the covering 24 can be backed with some stiff material 29 for example, paper or metal to add strength and rigidity. This backing 29 may be molded to the covering 24 or may be attached in any other suitable and well known manner.

The present door covering may be easily cleaned while washing the car, and due to its resilient character is practically indestructible. However in cases where the covering becomes mutilated it may be easily and inexpensively replaced without resorting to the necessity of reupholstering the door.

While the embodiment of the present invention as herein disclosed, constitutes a preferred form, it is to be understood that other forms might be adopted, all coming within the scope of the claims which follow.

What is claimed is as follows:

1. In an automobile body, in combination, a swinging door and a door frame therefor, a door covering comprising a sheet of resilient non-metallic material attached to the door adjacent the lower edge thereof and covering a substantial part of the door, a resilient, outwardly extending lip associated with said sheet and disposed adjacent the lower outside edge thereof, upwardly extending resilient lips at both sides of the door and associated with the sheet, said lips being so arranged as to yieldably contact and flex against the door frame when the door is in closed position, for sealing the door to the frame around the lower part thereof.

2. In an automobile body, in combination, a swinging door and a door sill therefor, a scuff strip comprising a sheet of soft rubber, a backing of relatively stiff material fastened to said sheet, said backing and sheet being attached to the door and covering a substantial part of the door, and an outwardly extending resilient integrally molded lip on said sheet extending around the outer three sides of said sheet, said lip being adapted to contact and flex against the door frame and function as a seal against the door frame when the door is closed.

3. In an automobile body, in combination, a swinging door and door frame therefor, a scuff strip comprising a sheet of resilient material, a backing of relatively stiff material fastened to said sheet, said backing and sheet being attached to the door and covering a substantial part thereof, and an outwardly extending resilient lip associated with said sheet and integrally molded thereto, said lip being adapted to contact and flex against a portion of the door frame and thereby function as a seal when the door is in closed position.

4. In an automobile body, in combination, a swinging door and door frame therefor, a door covering comprising a sheet of resilient rubber-like material attached to the door adjacent the lower edge thereof for covering a substantial portion of the door and acting as a scuff strip thereon, a resilient outwardly extending lip associated with said sheet and being so arranged as to yieldably contact and flex against a portion of the door frame when the door is in closed position for sealing the door to the frame adjacent the lower part thereof.

5. A scuff strip for vehicle doors, comprising a sheet of resilient rubber-like material for attachment to the lower edge of the door and adapted to cover a substantial portion thereof, a resilient outwardly extending lip integral with said strip arranged to yieldably contact a door frame when the door is closed and form a weather seal therewith.

HARVEY D. GEYER.